United States Patent
Bechet et al.

(10) Patent No.: US 9,785,889 B2
(45) Date of Patent: Oct. 10, 2017

(54) AUTOMATED EVALUATION OF TEST LOGS

(71) Applicant: Rohde & Schwarz GmbH & Co. KG, Munich (DE)

(72) Inventors: Andrei Bechet, Munich (DE); Francesco Rossetto, Planegg (DE); William Powell, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 383 days.

(21) Appl. No.: 14/489,858

(22) Filed: Sep. 18, 2014

(65) Prior Publication Data
US 2015/0081614 A1 Mar. 19, 2015

(30) Foreign Application Priority Data
Sep. 18, 2013 (DE) .......... 10 2013 218 660
Nov. 28, 2013 (DE) .......... 10 2013 224 378

(51) Int. Cl.
 *G06N 7/00* (2006.01)
 *G06N 5/02* (2006.01)
 *G06F 11/30* (2006.01)
 *G06F 11/36* (2006.01)

(52) U.S. Cl.
 CPC ........... *G06N 7/005* (2013.01); *G06F 11/30* (2013.01); *G06F 11/3692* (2013.01); *G06N 5/027* (2013.01)

(58) Field of Classification Search
 None
 See application file for complete search history.

(56) References Cited

U.S. PATENT DOCUMENTS

| | | | |
|---|---|---|---|
| 8,422,377 B2 * | 4/2013 | Weiner | G06F 19/3412 370/241 |
| 2006/0242288 A1 * | 10/2006 | Masurkar | G06F 11/0709 709/223 |
| 2009/0161559 A1 * | 6/2009 | Bielig | G06F 11/2294 370/242 |

OTHER PUBLICATIONS

"Bayes-Klassifikator—Wikipedia", Stand: Jul. 23, 2013, <<http://de.wikipedia.org/w/index. php ?title= Bayes-Klassifikator&oldid= 120816007>>.
Gustavsson, D. et al., "Expert System for Error Analysis—Rule Based Reasoning Applied on Log Information and Dump Reports from Mobile Phones", Master's dissertation, Jun. 2010, accessible at <<http://fileadmin.cs.lth.se/ai/xj/DanielGustavsson/ADLA_Report_ 100615.pdf>>.
Liggesmeyer, P. "Software-Oualitat: Testen, Analysieren and Verifizieren von Software" Springer, 2009 p. 381.

* cited by examiner

*Primary Examiner* — Alan Chen
(74) *Attorney, Agent, or Firm* — Lee & Hayes, PLLC

(57) ABSTRACT

An automated evaluation of test logs for the testing of telecommunications equipment includes a probabilistic model that links possible events in a test log with possible causes for the event. Probability values for possible causes are calculated from the probabilistic model and a search result, and a reference to a possible cause is provided in an output based upon the calculated probability values.

17 Claims, 7 Drawing Sheets

AUTOMATED EVALUATION OF TEST LOGS

This Application claims foreign priority under 35 U.S.C. §119(a) to German Patent Application Nos. DE 10 2013 218 660.6, filed Sep. 18, 2013, and DE 10 2013 224 378.2 filed Nov. 28, 2013, both of which are incorporated herein by reference.

FIELD OF INVENTION

The present invention relates to a method for the automated evaluation of test logs for the testing of telecommunications equipment and a corresponding computer-program product and a computer system.

BACKGROUND OF THE INVENTION

In technical communications systems, signalling information for the implementation of data communications and/or speech communications between people and/or machines is exchanged between participating equipment. Accordingly, for example, in the mobile-radio sector, signalling messages are exchanged via the air interface between user equipment (UE, "user equipment", for example, smart phones) and network nodes (for example, base stations).

Before the provision of new equipment, new software releases, new features etc., the error-free message exchange across the relevant interfaces must be tested. Accordingly, functional tests must be implemented, but also system tests, including load and stress tests, regression tests etc. As a rule, these tests are implemented in an automated manner, for example, special test equipment (TE, "Test Equipment") can exchange messages with the device under test (DUT, "Device under Test") in the batch mode. An automated test can run over a relatively short time span of, for example, a few minutes or may require a considerably longer time disposed in the region of one hour, several hours or even days.

During the test, the message exchange via one or more interfaces is logged (generally by the TE) and stored in a test log or test protocol. After the completion of the test, the test log can be present in the form of a file, for example, a text file. In general, the log contains a chronological sequence of occurrences or events, that is, the log comprises a list of timestamps, wherein a message is allocated to every timestamp. The data of the message can comprise selected details, for example, given message contents, such as the presence and/or the value of parameters, embedded messages of lower message-log layers and so on.

In general, it is the events listed in the test log and only these which axe available for the identification of problems and determination of their cause.

An evaluation of the test log can be implemented on site in the test laboratory. However, because of its complexity, the evaluation is generally implemented at a later time, and therefore outside the test laboratory. On the one hand, the evaluation comprises the identification of error situations, which includes the recognition that an error situation is present in the first place, and, on the other hand, the search for causes of known error situations. In simple cases, the presence of an error and its cause can be unambiguously inferred on the basis of a message or message sequence. For example, a software error in the DUT can influence a given parameter value of a message; if this is evident from the log, the cause for a restart of a DUT or of a component can be identified.

Often, however, an error situation or an event may, in principle, be attributable to different causes. In such cases, it is difficult to draw an inference about the actually present cause for the error in concrete terms, and this may require a broader evaluation of the log.

A testing of a UE (for example, a smart phone) in which the UE has already successfully synchronised with a mobile-radio network, for instance, on an RLL ("Radio Link Layer") can be used as an example. It is evident from the test log that the UE suddenly tries to synchronise with the network again; for example, the UE suddenly initiates a new Random-Access-Procedure. The occurrence of this message in fact always indicates that a problem is evidently present here, however, a series of different causes for this behaviour are conceivable; for instance, an error may be present in the UE, but a reaction of the UE to the test conditions may also be involved, such as a simulated power loss in the radio network, for example, as a result of an error in the network or a movement of the UE within the network, for example, in order to bring about a handover etc. It is not easy to determine whether an error situation is present at all in this case, and if it is, to which concrete cause the error can be attributed.

Ambiguous (error) situations, as in the example, represent a fundamental problem in the evaluation of logs from automated tests, for example, in the telecommunications sector.

Searching and evaluation of the log can be implemented by a human tester. However, a test log can also contain very many data even with test durations of only a few minutes, because of the complexity of modern communications systems and the corresponding signalling volume, so that an analysis by human test personnel is very time-consuming. Furthermore, because of the volume of data, it cannot be ascertained that all error situations have been identified as would be desirable. Error situations may possibly also have been be incorrectly evaluated, because only a consequential effect or a subsequent influence of the error is identified rather than the underlying error.

Testing instruments or respectively tools are known which are supposed to support the human tester in the evaluation. For example, parts of the log can be displayed in different colours, in the case of a display on the screen, for instance, in order to improve readability. Accordingly, different message-log levels, for instance, can be displayed differently. Furthermore, a test tool can support the search for a given text string in a text-based test log. The strings then characterise, for example, a given message type, a given error situation etc. Such string searches can also be implemented in an automated manner.

Expert systems for an automated evaluation of test logs are also known, D. Gustaysson, D. Molin, "Expert System for Error Analysis—Rule Based Reasoning Applied on Log Information and Dump Reports from Mobile Phones", Master's dissertation, June 2010, describes such an expert system. This system comprises knowledge which is represented, for example, in the form of a plurality of rules. The system can accordingly draw inferences, and in fact, specified decision trees are run through dependent upon an evaluation of the rules. A rule comprises a condition component and a result component. A possibly occurring event can be represented in the condition component, and an inference can be represented in the result component. The expert system thus searches the test log for the occurrence of the condition specified in the condition component, which generally corresponds to a string search ("Pattern Matching"), and then draws corresponding inferences from this.

Such decision trees are very suitable for detecting specific errors, that is, well-defined events which are attributable to a previously determinable, unambiguous cause. If a plurality of corresponding decision trees is stored in a data bank, a corresponding plurality of problems in the test log can, in principle, be identified and solved.

Such expert systems therefore represent an efficient tool which supports the human tester in reliably determining the presence of corresponding errors and in determining their cause.

However, the known expert systems cannot efficiently handle error situations which are not clearly defined. Accordingly, problems are not recognised if they do not fit exactly with a previously defined condition. Even the absence of a message means that an expert system can no longer draw a meaningful inference. Known expert systems can therefore support the human tester only in detecting and explaining simple error situations. However, the human tester must generally search through the entire log for the occurrence of complex error situations and clarify these errors exclusively on the basis of personal experience.

In fact, known expert systems can be steadily developed to include an ever-increasing range of conceivable error situations, however, such expansion is subject to limits of scale: for every new error situation, a corresponding new decision tree must be implemented. While constantly improving granularity of the system is required, this leads to a rapidly increasing complexity of the expert system. The maintenance of the system, for example, tracking changes in the message logs, therefore becomes correspondingly elaborate, that is, complex and susceptible to error.

Thus, one object of the present invention is to propose efficient solutions for an automated evaluation of test logs in the field of testing telecommunications equipment, which achieve a reliable support of the human tester in the identification and/or resolution of complex error situations.

SUMMARY OF THE INVENTION

According to one aspect of the invention, a method for the automated evaluation of a test log for testing telecommunications equipment is proposed which comprises the following steps: provision of a pre-defined probabilistic model, which links a plurality of events which can occur in the test log with a plurality of possible causes; searching the test log for the occurrence of the events; calculation of probability values for causes on the basis of the probabilistic model and a search result; and provision of an indication of at least one possible cause for events which have occurred and/or have not occurred in the test log on the basis of the calculated probability values.

In general, the telecommunications equipment under test can be telecommunications (TC) user equipment (UE), that is, for example, user equipment for users, consumers etc., for example, a mobile-radio device, such as a smart phone, a tablet, surf-stick etc. It can also be user equipment for another cordless or respectively wireless, or also cord-supported or respectively wire-supported communications system, for example, a device which is equipped for communication according to a LAN standard, WLAN standard etc. An implementation of an interface, for example, in the form of an interface card, a socket etc., for instance, for the realisation of the communications interface, such as an IP interface in a device, such as a PC or Notebook, can also be regarded as a TC device.

Conversely, within the framework of the present disclosure, nodes or components thereof, which form part of a (tele-) communications network, are also understood as TC equipment, wherein the network can also comprise only the node, which, as a DUT, exchanges messages with a TE, for example, for test purposes, wherein, for example, the TE emulates a user device. The network node can therefore be, for example, a base station, such as a BSS ("Base Station Subsystem") or an eNE ("evolved Node B") of a mobile-radio network or another node in the radio or core network of such a network or generally of a communications network. Accordingly, the DUT can be, for example, an access node of an arbitrary wireless or wire-supported communications or telecommunications network.

In general, special equipment which is embodied for the emulation of one or more network nodes and/or user devices is used as the TE. As a rule, the TE further comprises a component for logging the data exchange via an interface with the DUT, that is, for example, a sniffer or another tool for network analysis.

The test log can be a test report, a log-file and/or a dump-file, such as is prepared during an automated test, for example, by the TE. The test log can be present in the form of one file or several files, for example, as a text file, which, for instance, contains data in ASCII- or HTML-format or another searchable format.

An event ("event") comprises at least one process which can be found in the test log. For example, an event can be the transmission of a given message or message sequence which is transmitted via a given interface (for example, a synchronisation message). However, the non-detection of an observation or respectively of a process in the test log can also be defined as an event, for example, the absence of a message.

A cause ("cause") also comprises at least one process (for example, a handover). It is conceivable that this process can also be derived directly from the test log. However, under some circumstances, mere detection does not prove that this process was causative of a process which is defined as, or respectively has been detected as, an event.

A search of the test log can be implemented, for example, on the basis of a string search ("pattern matching") or more generally in the form of a search for a given pattern (pattern identification or respectively "pattern recognition"). Methods for pattern recognition are known as such to the person skilled in the art. The search can extend over the entire test log or only over a part of the log. The search can contain conditional components, wherein a targeted search for one or more further patterns is implemented only after the detection (or non-detection) of a pattern.

The probabilistic model can represent statements regarding the probability with which a given event is attributable to a given cause. The probabilistic model can be regarded as a formalisation or respectively a technical realisation of links (relations) between the events and the causes, wherein the links can be allocated to probability values.

The probabilistic model can represent a network in which the events and the causes are nodes of the network which are linked to one another. Such a network can be regarded as a classifier ("classifier") in the sense of the classification method known from general information technology and is therefore also referred to in the following as a classifier.

With some embodiments, the network provides links only between one event in each case and one cause in each case, but does not provide links only between events, or only between causes. In given embodiments, each link connects precisely one event with precisely one possible cause. In some of these embodiments, every event is linked with all possible causes which are represented in the probabilistic model.

A predefined probability value can be assigned to at least one link in the probabilistic model, which is used in calculating the probability values for the possible causes. With given embodiments, precisely one probability value is assigned to each link of the model or respectively network. The probability values can be represented, for example, as numerical values between 0 and 1, or between 0% and 100%.

The probabilistic model can comprise a Bayesian network, that is, it can represent a Bayesian classifier. Additionally or alternatively, the model can comprise a Markov network, a neural network, and/or a decision tree.

The alphabet which is available to the event nodes in the network can be binary, that is, for example, it can comprise only the values "true" ("True", "1", etc.) and "false" ("False", "0", etc.). Accordingly, during the search, it is only checked whether an event occurs or does not occur, that is, for example, whether a given message or message sequence occurs or does not occur in the test log with several messages etc. The probability values allocated to the links can then specify the probability with which the occurrence of the message is attributable to the respective cause, or the probability with which the non-occurrence of a message is attributable to the cause.

In some embodiments, separate probabilities can be assigned, for example, to the occurrence or respectively non-occurrence of a message (or also of a parameter or parameter value); that is, both the occurrence of a message or more generally of a pattern ("pattern") and also the non-occurrence of the pattern can be provided as separate events in a classifier.

With other embodiments, an alphabet can comprise more than two values, and can provide, for example, ten or more values. In addition to the occurrence or non-occurrence of a message, an event can therefore also relate to the occurrence or non-occurrence of a parameter in a message, and/or the occurrence or non-occurrence of a parameter value of a parameter in a message. Such a network can be converted into a network with a binary alphabet, wherein several events can then relate to one and the same message, but, for example, to different message contents or given parameter values etc.

The probabilistic model can include the possibility of an unknown cause. If an event is attributable to given causes with given probabilities, a linking of the unknown cause with a remaining residual probability can be provided. An indication that a cause for a given event or several events could not be found at least indicates to the human tester that known causes are present with a low probability, that is, for example, can be excluded in practice.

The probabilistic model can comprise a two-layer network with an event layer and a cause layer. The probabilistic model can also comprise several two-layer networks or respectively a three-layer or multi-layer network. The probabilistic model can therefore, for example, comprise an event layer, an intermediate layer and a cause layer. The nodes of the intermediate layer can represent causes for the event layer and/or events for the cause layer. If the three-layer model is treated as a combination of a first and a second two-layer model, the first two-layer model can then be calculated first, wherein events found in the test log can be attributed to causes of the first model. The causes (or respectively the nodes of the first model representing the causes) are then regarded as events (or respectively the nodes representing events) of the second model and therefore, for example, as derived events. Probabilities of superordinate causes can then be calculated on the basis of the second model.

Three-layer or multi-layer models can be used, for example, to analyse chronologies of events. In this context, at least one node of the intermediate layer can represent a chronological sequence of events.

Furthermore, according to the invention, a computer-program product is proposed for the implementation of a method as outlined above or described elsewhere in this disclosure, if the computer-program product is executed on a programmable computer system or a digital signal processor.

The computer program can be stored on a machine-readable data carrier, for example, a permanent or re-writable medium in or in association with a programmable computer device or a CD-ROM, DVD or USB stick. Additionally or alternatively, the computer program can be provided for downloading onto a programmable computer device, for example, via a data network, such as the Internet or another communications connection.

Furthermore, a computer system is proposed according to the invention on which a computer-program product such as that outlined above is implemented. The computer system can be a device such as a conventional PC, a Notebook, tablet or similar, which is used for the test evaluation. However, the computer-program product can also be installed on a DSP, for example, a processor of a TE.

An expert system for the evaluation of test logs of telecommunications equipment can be implemented on the computer system. The computer-program product can provide an evaluation tool within the framework of the expert system.

The evaluation tool can be embodied to receive user entries. For example, the entries can relate to the consideration of at least one event and/or the consideration of at least one cause, which can be specified, for example, manually or selected from a menu. Additionally or alternatively, the user entry can also relate to the indication of at least one probability value for a link. Accordingly, the probability values of some or all existing links of a probabilistic model can be entered or amended manually. For example, specified values can be matched. Aspects of the classifier, such as the probability values, can also be updated through a software update. Additionally or alternatively, the tool can also be embodied as a learning system, for example, in that it receives reply messages of the user and matches aspects of the classifier accordingly.

An evaluation tool can provide a plurality of probabilistic models for different questions for the test evaluation. Accordingly, for example, an independent window ("View") can be provided for every classifier.

According to the invention, events which can be detected in a test log can be regarded as observations of a probabilistic model. This approach allows the allocation of probability values to the links between the observations and their possible causes. In this manner, a classifier can be defined which allocates sets of observations or events with given probabilities to sets of causes or hypotheses.

The invention allows an automated evaluation of test logs in the field of communications systems in which different possible causes can be considered, that is to say, treated as hypotheses for observations or measurements, that is, for events found in the test log. For this purpose, links between detected or respectively observed events and possible causes or interpretations can be defined in a probabilistic (graphic)

model, such as a Bayesian network. Probabilities can be allocated to the links, of which the values can result, for example, from theoretical analyses and also from experience. The system can also be designed to be self-learning, so that the probability values allocated to the links can be matched, for example, on the basis of reply messages of the test personnel.

The invention therefore allows the automated detection and/or clarification of complex error situations or respectively the support of the test personnel in these tasks. The automated log analysis can increasingly cover problems which are not linked to given events with a one-to-one correspondence. Indeed, analysis tools according to the invention can also distinguish between causes which have in common one observation or several observable events.

A tool according to the invention therefore achieves an increased reliability in the test evaluation, not only for simple but also for more complex error situations and can support human test personnel better in this manner, in that fewer problems are overlooked or incorrectly identified. The tool can also serve to exclude certain causes (with a corresponding probability); this also contributes to the clarification of complex error situations and leads to a more efficient test evaluation.

In principle, decisions between competing hypotheses can also be made by running through conventional decision trees. However, the effort for the preparation and matching of such trees is high, and running through the decision trees is calculation intensive. By contrast, the provision and maintenance of probabilistic models used according to the invention is associated with reduced effort, and decision-making requires fewer processor resources.

A classifier of an analysis tool according to the invention can be simply expanded by adding, for example, a further cause. Methods according to the invention are generally more readily scaled, for example, than methods based on decision trees, which leads to corresponding advantages with regard to the effort required for administration, maintenance, updates etc.

BRIEF DESCRIPTION OF THE DRAWINGS

Further aspects and advantages of the invention are described below with reference to the attached drawings. The drawings show.

DETAILED DESCRIPTION OF EMBODIMENTS OF THE INVENTION

Figure 1:
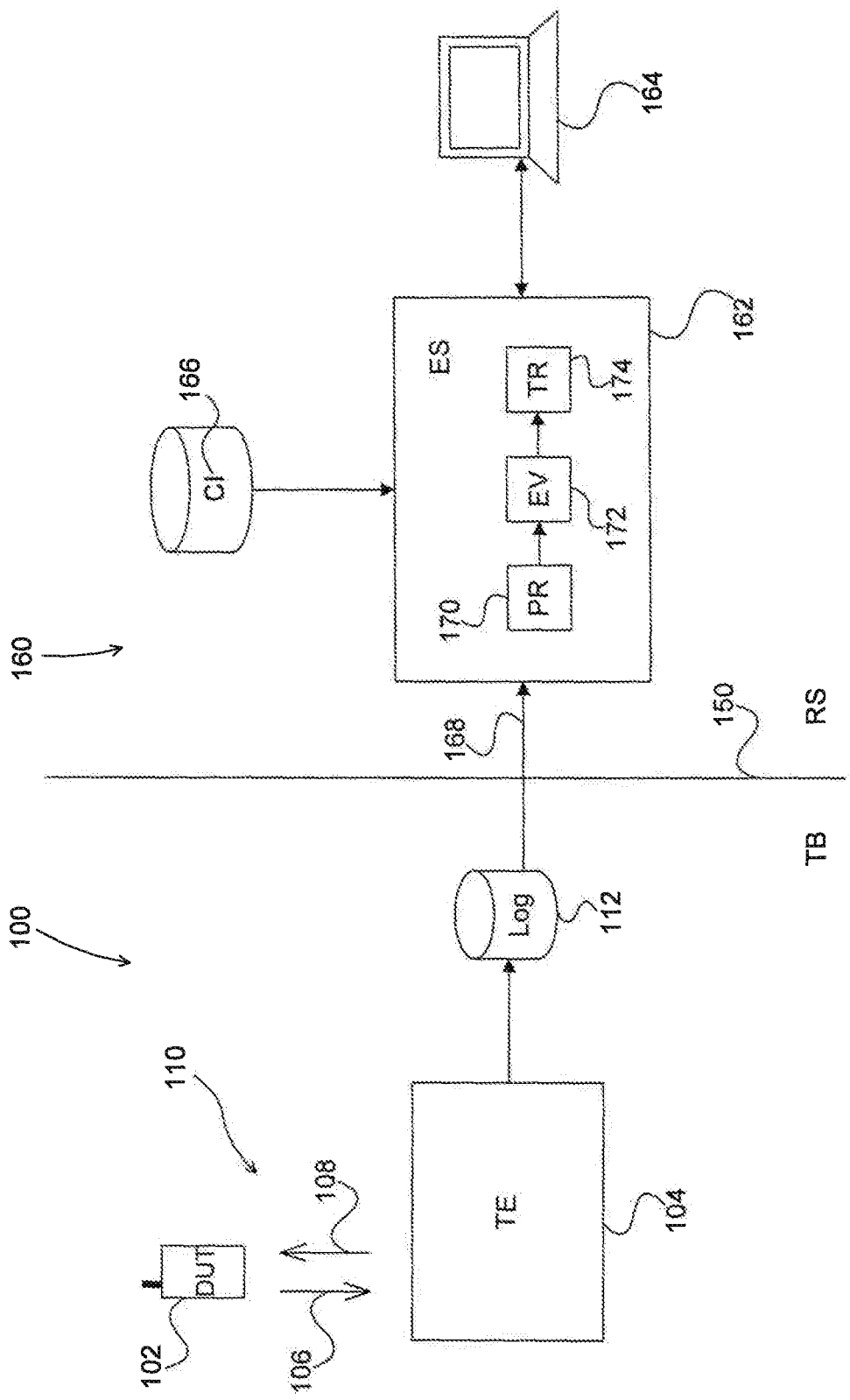
FIG. 1 an exemplary embodiment of a system according to the invention for test evaluation in schematic form.

FIG. 1 visualises in schematic form an exemplary embodiment of a test system 100 and of a test evaluation system (RS, "Reporting System") 160. The test system 100 is a part of a test environment TB ("Testbed") or respectively of a test laboratory such as is otherwise known to the person skilled in the art. The test system 100 comprises a telecommunications device under test (DUT, "Device under Test"), in the example, a user device 102 for a mobile-radio network. The test system 100 further comprises a test equipment (TE, "Test Equipment") 104.

A testing of the user device 102 comprises the transmission 106 of messages from the TE 104 to the DUT 102 and also the transmission 108 of messages from the DUT 102 to the TE 104. In this context, the message exchange 106, 108 runs via at least one interface 110, that is, for example, via an air interface. Via the interface 110, the TE 102 can emulate, for example, the behaviour of a case station of a mobile-radio network for this purpose.

The TE 104 logs the test procedure, that is, especially the messages transmitted 106 and respectively received 108 via the interface 110, in a test log ("Log") 112, which can be present, for example, after the completion of the test in the form of one or more computer-readable files. Dependent upon the type and the purpose of the test, a plurality of messages can be exchanged via the interface 110. For each message, further details are generally logged, for example, embedded messages of lower log layers, existing parameters, optionally with parameter values, etc., so that a correspondingly extensive test log 112 is obtained, as is known to the person skilled in the art.

The evaluation system (RS, "Reporting System") 160 is separated from the testing system 100 or respectively the testbed TB, as indicated by the line 150. As a functional component, the RS 160 comprises an expert system (ES) 162, which can be implemented on a computer system, which is not shown in greater detail here, for example, a conventional office PC or a computer network with distributed resources, such as a conventional office network. Alternatively, the expert system can be implemented on the TE 104, or on a notebook or similar portable device, for example, in order to allow a test evaluation on-site in the case of a service.

Human test personnel, that is, a human tester or human test team, initiates the test evaluation via a console (input/output system) 164 and receives the results via the console 164, which can comprise, for example, a keyboard and/or other entry means and a display and/or other display means including electronic storage capacities for the storage of result reports.

The expert system 162 has access to a database (databank), which provides, in particular, at least one classifier (Cl. "Classifier") 166. For the implementation of the test evaluation, the expert system 162 gains access 168 to the test log 112. A test evaluation can be triggered, for example, by the test personnel, by means of a corresponding command issued via the console 164. Following this, a functional component 170 implements a search of the test log 112 for every classifier (PR, "Pattern Recognition"), that is, the component 170 searches the log 112 for the occurrence of given patterns, for example, character sequences, such as message identifiers. These patterns are specified by the classifier 166.

A functional component 172 implements an evaluation processing (EV, "Evaluation") on the basis of the detection and/or non-detection of the results. This processing is also specified by the classifier 166. On the basis of the processing, a functional component 174 determines test results (TR, "Test Results"), which can be presented to the test personnel in the form of a result report, for example, for storage in the form of a result file and/or for output at the console 164.

Figure 2:
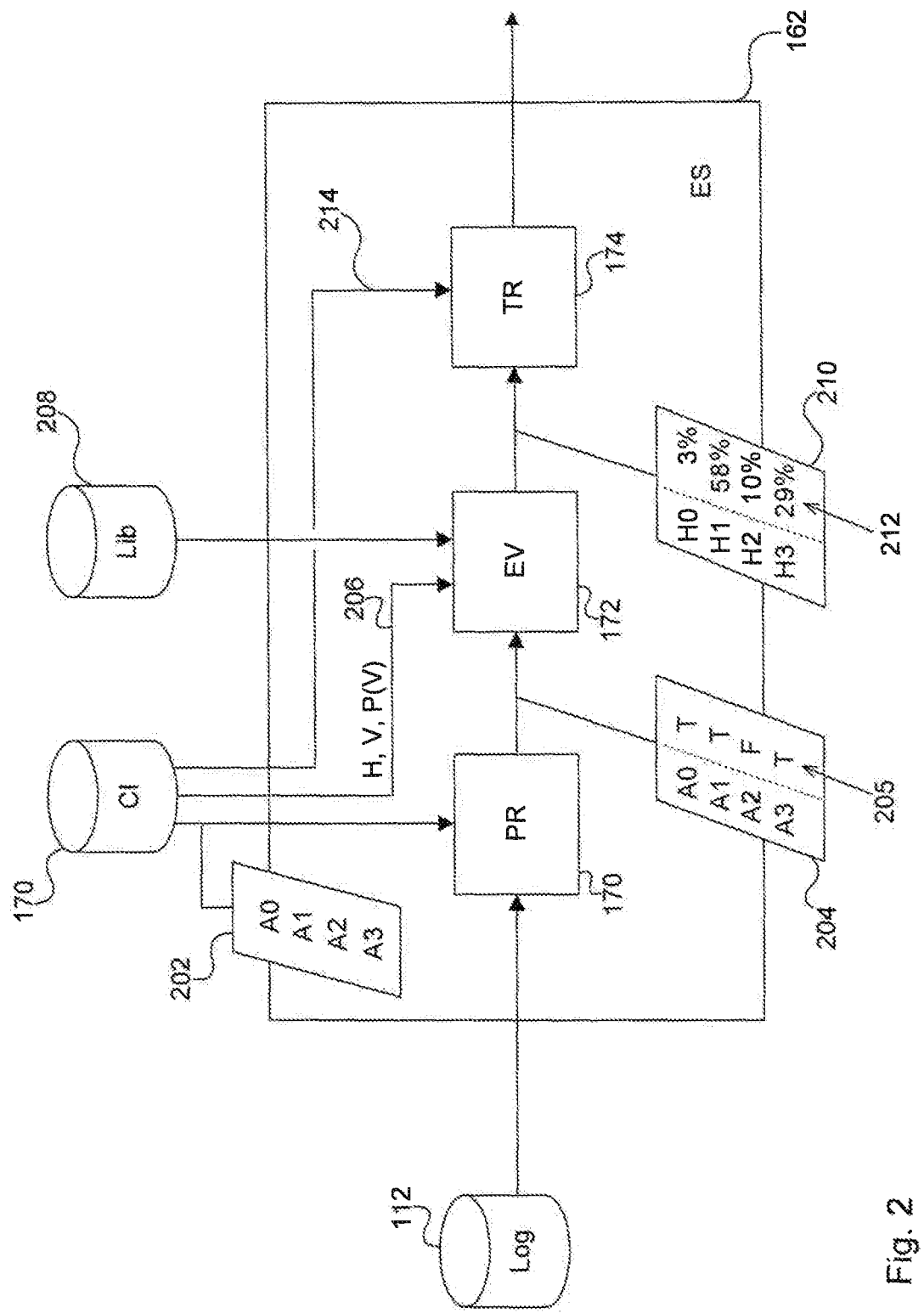
FIG. 2 a detailed view of the system from FIG. 1.

FIG. 2 shows the expert system 162 with the components 170, 172 and 174 and further details which will be referred to in the following in the description of exemplary test evaluations.

Figure 3:
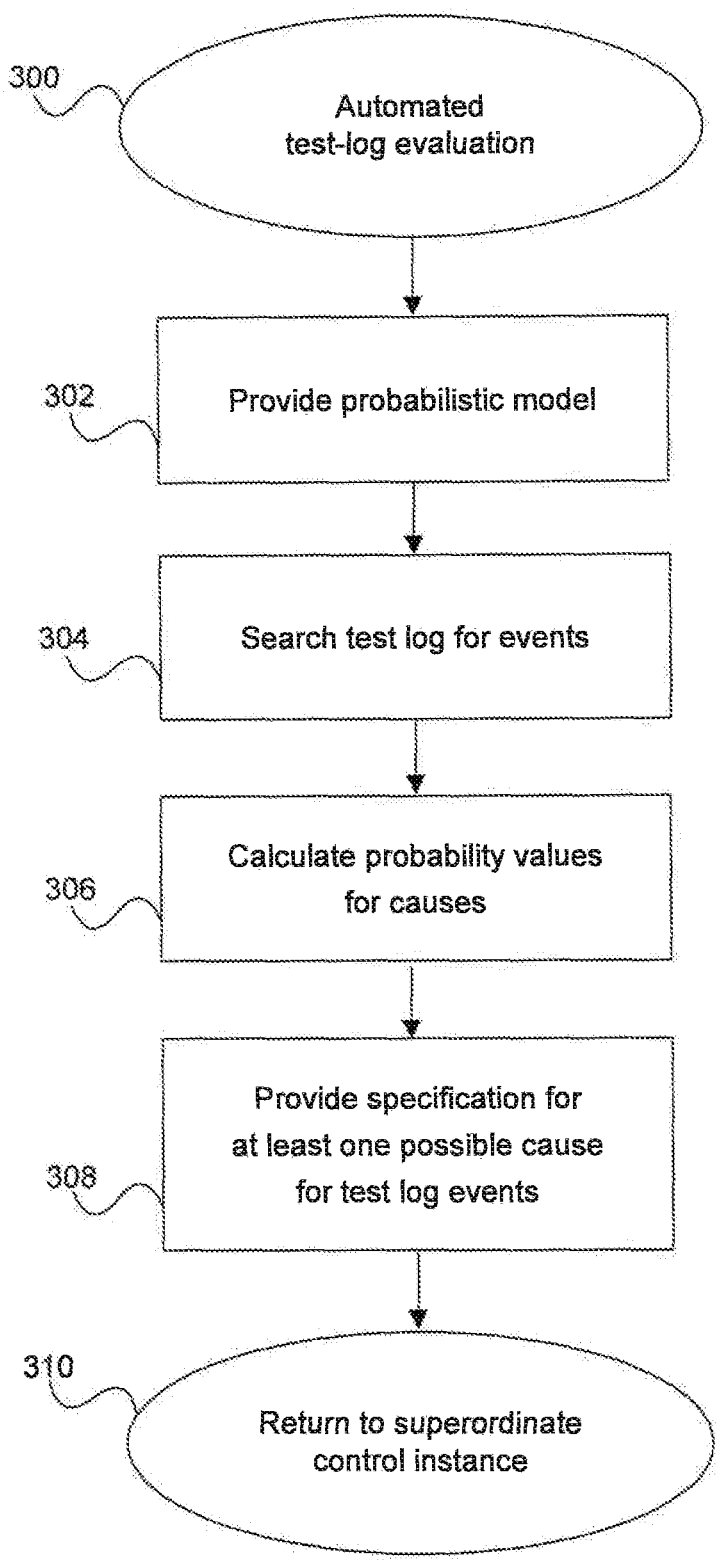
FIG. 3 a flow chart for a first exemplary embodiment of a method of operation of the system from FIGS. 1 and 2.

FIG. 3 shows a flow chart which visualises an operation (processing) 300 of the expert system 162 from FIGS. 1 and 2 by way of example. The operation 300 relates to the automated evaluation of the test log 112 for the testing of the telecommunications equipment 102.

In step 302, a pre-defined probabilistic model is presented, which links a plurality of events which can occur in the test log 112 with a plurality of possible causes. The probabilistic model in the example described here can comprise the classifier 166. In step 304, the test log 111 is searched by the component 170 for the occurrence of the events specified by the classifier 166.

In step 306, probability values for the causes specified by the classifier 166 are calculated by the component 172 on the basis of the probabilistic model and a result from the investigation implemented in step 304. In step 308, the component 174 provides an indication of at least one possible cause for events which have and/or have not occurred in the test log, and in fact, on the basis of the calculated probability values. In step 310, the method ends, for example, in that a procedure control is returned to a super-ordinate control program within the framework of the expert system 162 or test-evaluation system 160.

Figure 4:
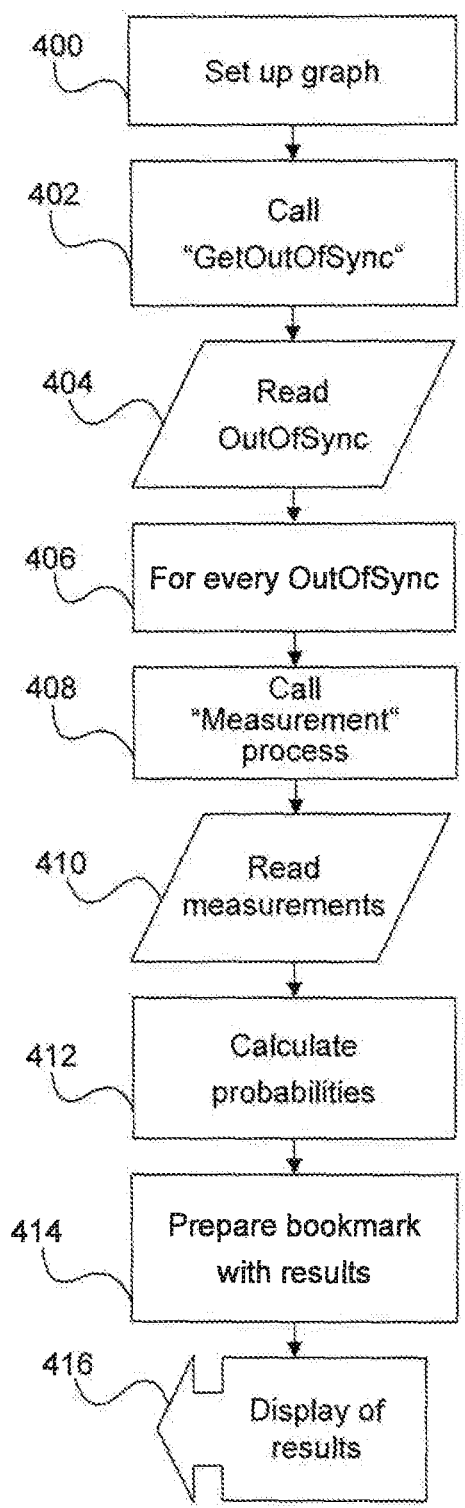
FIG. 4 a flow chart for a second exemplary embodiment of a method of operation for the system from FIGS. 1 and 2.

In the form of a flow chart, FIG. 4 shows a further exemplary embodiment of an operation (processing) 400 of the expert system 162 of FIGS. 1 and 2. With regard to aspects not explicitly addressed, it can be assumed that these correspond to those of the operation 300 in FIG. 3. Conversely, many aspects described in the following with regard to the processing 400 are also applicable for the procedure 300.

The processing 400 also relates, for example, to the automated evaluation of the test log 112, wherein the graph of a specified probabilistic model is set up for this purpose. The operation 400 can be implemented by a computer program and can be initiated, for example, by an entry via the console 164. The processing 400 can run in a batch mode and/or can run in the background, while other processes can be controlled, via the console 164 or other components of the evaluation system 160 not shown. The processing can comprise a presentation of an evaluation result on the console 164 after the initiation of the processing 400.

The operation 400 describes a procedure from the perspective of a main program. The functional components 170, 172, 174 can be implemented in the form of sub-procedures, which are each controlled by a call from the main program. The main program can implement, for example, the expert system 162, or respectively an instance of it. However, other configurations are also conceivable.

In step 402, a process (program, sub-routine, function, etc.) "GetOutOfSync" is called up. On the basis of this process, in step 404, the data of the classifier 166 are made available to the expert system 162, for example, by reading in the classifier 166 "OutOfSync". From step 406, the further processing is implemented according to the date specified by the classifier 166. Steps 402 to 406 can be regarded as a concrete realisation of step 302.

Figure 5:
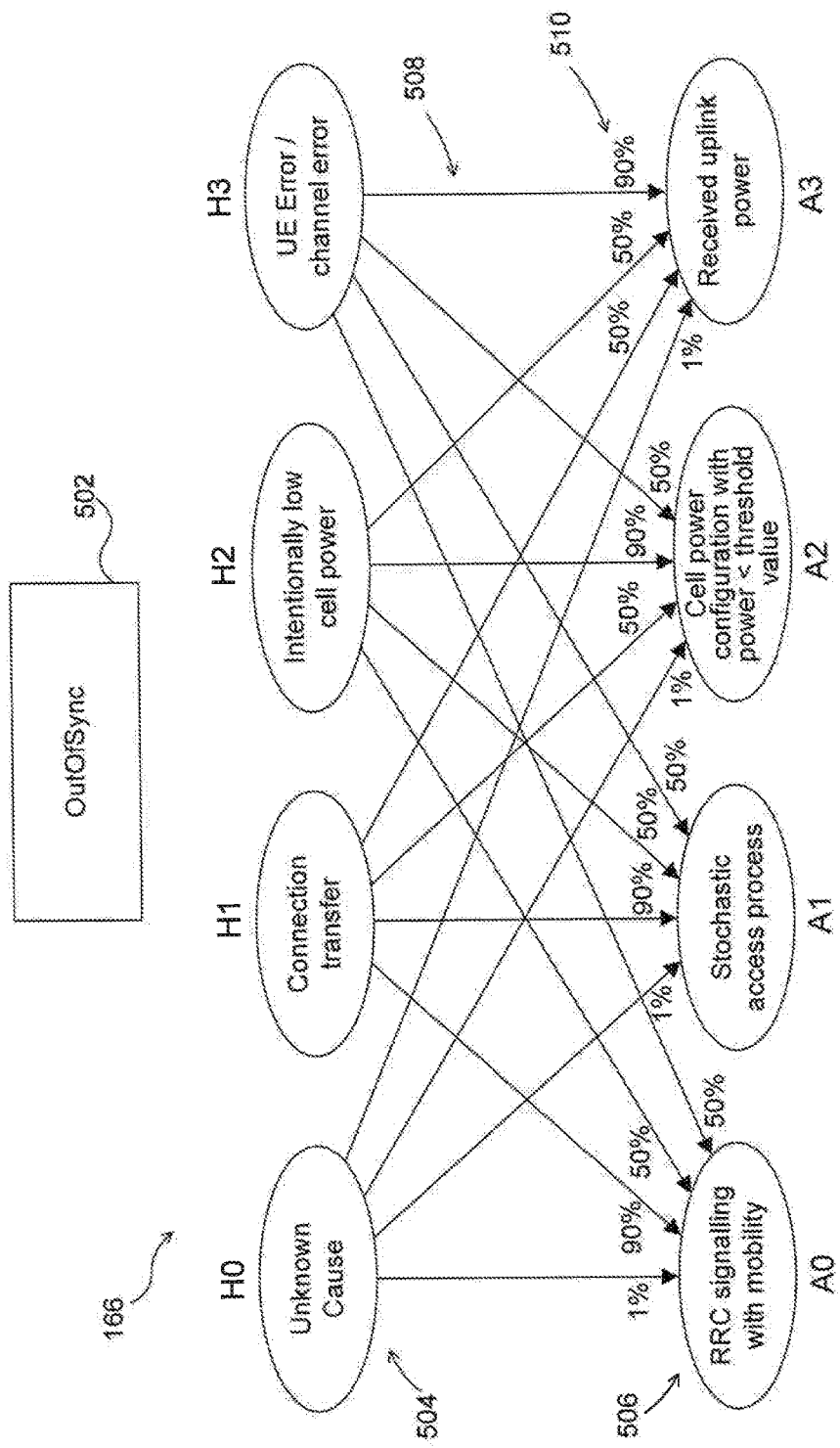
FIG. 5 a schematic view of an exemplary embodiment of a classifier according to the invention, such as can be used in a test system from FIGS. 1 and 2.

FIG. 5 represents a visualisation of the classifier or respectively probabilistic model or network 166. By way of example, the classifier 166 implements a decision network for a why-question 502, namely, why a mobile-radio device has dropped our of synchronisation with a mobile-radio network ("Out of Sync") or respectively cannot set up a synchronisation situation.

For this purpose, a plurality of possible causes 504 or respectively hypotheses H0, H1, H2 and H3 and furthermore a plurality of possible events 506 or observations (statements) A0, A1, A2, A3 with their abbreviations, known as such to the person skilled in the art, of the messages or respectively message sequences, are represented. In the following, English equivalents for the technical terminology used in FIG. 5 are indicated: "connection transfer" corresponds to "Handover"; "RRC-signalling with mobility" corresponds to RRC signalling w/mobility"; "stochastic access procedure" corresponds to "Random Access Procedure"; "Cell-power configuration with power<threshold value" corresponds to "CellPowerConfig w/power<threshold"; "received uplink power" corresponds to "Received uplink power".

The cause H0 represents at least one unknown cause; with the latter, observations can be taken into consideration, for example, given combinations of the occurrence and/or non-occurrence of events which match none of the known causes H1, H2, H3. The unknown cause H0 therefore provides an indication to the human test evaluator that the expert system was not able to identify any probable cause; that this should therefore be implemented by the test evaluator; and/or that, after the detection of the "unknown" cause, the expert system could optionally be supplemented with the latter.

Every event is linked to every cause by precisely one link (relation, edge) 508. Conversely, every link 508 links precisely one event with precisely one cause. The links 508 are illustrated in FIG. 5 as arrows, that is, the classifier 166 is a directional graph, wherein the arrow directions indicate a causality direction, according to which one or more events 506 follow from a cause 504. The result of the processing discussed here therefore consists in inferring from observed events the most probable cause or the most probable causes, even if these, or some of these, are not observable or not directly observable.

The classifier 166 represents the causes 504, events 506 and links 508 in the form of a Bayesian network, in which a value 510 which indicates a probability is assigned to every link 508. The probability values 510 can be interpreted as probabilities that the event 506 designated by the corresponding link 508 is attributable to the cause linked by the link 508. These probability values 510 can be specified within the classifier 166 as constants. The values 510 can be specified during the development of the classifier 166 or the expert system 162, updated by a software/firmware update, and/or entered or amended by a user of the expert system 162 or the test-evaluation system 160. In an administrative mode in which no test evaluations are implemented, the expert system can thus, for example, receive entries via the console, with which the probabilities 510 can be entered or amended by test personnel, and matched, for example, with concrete empirical values.

It is also conceivable that other aspects of the classifier are variable. For example, it may be possible for a user to add a further cause to the causes H0-H3 via the console 164 and/or to remove one or more of the causes H0-H3 from the graph 166. Similarly, it may be possible for a user to add an event to the events A0-A3 and/or to remove one or more of the events A0-A3 from the graph 166. The addition and/or removal of nodes 506, 508 can be implemented, for example, via a menu choice, with which processes or respectively statements comparable with the processes H0-H3, A0-A3 are offered to the user. For example, a menu can offer a selection of messages of a given log stack for a given interface, such as the interface 110 in FIG. 1.

With step 408 in FIG. 4, which may correspond to step 304 in FIG. 3, a "measurement" process, that is, a process for searching the test log is called up. In concrete terms, the component 170 can load, for example, a list 202 (compare FIG. 2) of character strings (string sequences), wherein at least one character string is defined for each of the events A0-A3 of the classifier 166. The character strings can correspond, for example, to an identifier of a message, with which this message is characterised in the test log 112. For reasons of clarity, the character sequences 202 in FIG. 2 are visualised only by the corresponding result designations A0-A3, also illustrated in FIG. 5.

The component 170 now implements a procedure for pattern recognition, that is to say, a measurement, or respectively a search or scan procedure, that is, for example, a check is carried out for each of the character strings 202 to determine whether this occurs in the test log 112. Additionally, further information can be measured, for instance, the position of the occurrence (such as the timestamp, and/or a position in the log file 112), allocated message contents, etc. It should be noted that an event 506 from FIG. 5 can also relate to the non-occurrence of a message, a parameter in a message etc., so that the component 170 also checks or respectively measures a corresponding non-occurrence.

After completion of the scanning procedure in step 408, the measurement results or respectively observations 204 (FIG. 2) from the processing component 172 are received, for example, read in, in step 410. If only the occurrence or non-occurrence of events is checked during the measurement process 408, the alphabet with which the events 506 are defined can be a binary alphabet, which, for example, comprises only the letters "T" ("True") and "F" ("False") 205. The observations 204 can then be communicated as a simple sequential list in which either a "T" or an "F" is assigned to every event A0-A3.

In the present example, it is assumed that the probabilities 510 indicated in the network or graph 166 in FIG. 5 relate to the "True" condition of the respective event 506, that is, the probability value 510 designates a probability with which an event which has actually occurred is attributable to a given cause 504, that is to say, the probability with which a given cause 504 is therefore present. In the case of a further exemplary embodiment, a further probability value can be assigned to at least one link 508, which indicates with which probability the correspondingly linked cause is present, if an event has not been detected. With a yet further exemplary embodiment, precisely one probability value is assigned to every link, but it is additionally specified whether the probability value relates to the occurrence or non-occurrence of the corresponding event.

The measured data 204 which have been read in can contain further information. Accordingly, for example, message contents can be transferred for detected events, or a time sequence of detected events can be transferred. The alphabet with which the events are defined can be correspondingly extensive. Finally, every alphabet can be related back to a binary alphabet, that is, a message with different message contents can be represented in the form of a plurality of atomic events, which are then only defined with a binary alphabet. However, event lists, such as the list 204, can become extensive. The concrete embodiment can be optimised on the basis of the above discussion for every individual case.

In step 412, the processing component 172 calculates probabilities for the causes 504 (hypotheses H0-H3) represented in the classifier 166. Alongside the events which are also available to the component 172 through the measurement results 204, the component 172 also reads in indicators 206 (FIG. 2) for the hypotheses 504, the links V 508 and the allocated probability values P(V) 510. These indicators 206 need not be text strings or percentages as used for the visualisation of the causes 504 and probability values 510 in FIG. 5; on the contrary, the indicators can be represented through internal variables of the expert system 162, for example, indices, integer numbers, pointers etc. The probability values 510 can be represented internally by real numbers.

The network or respectively the classifier 166 in this example is treated as a Bayesian network or respectively as a Bayesian classifier. Accordingly, a calculation of the probabilities with which the causes 504 of the graph 166 in FIG. 5 are defined, can be implemented on the basis of the probabilities 510 and the event list 204 by calling up a corresponding calculation system known as such. For example, the component 172 can draw on such a system from a corresponding library (Lib, "Library") 208 and/or implement the calculations in a corresponding sub-function.

As a result of the calculations, a list 210 (FIG. 2) is returned, in which, for example, all hypotheses H0-H3 and respectively possible causes 504 can be listed in each case with allocated probability 212. The presentation of the list 210 with indicators H0-H3 in FIG. 2 and percentages 212 has been selected only for reasons of clarity. In other exemplary embodiments, the hypotheses may still be characterised in the list 210 through internal indicators. The hypotheses indicators in the list 210 can also be completely dispensed with if the probabilities 212 can be allocated to the hypotheses 504 exclusively through their sequence in the list 210.

The steps 410 and 412 can correspond approximately with step 306. In steps 414 and 416, which can correspond approximately to step 308, the reporting component 174 receives the result data 210. Additionally, the component 174 can also call 214 (compare FIG. 2) data of the classifier 166, for example, textual descriptions of the causes 504, that is, for example, at least of the causes determined for output in a test report or on the console 164. The component 174 can foe embodied to write a test report into an existing file or a new file to be created automatically. The file can be output to the console 164 tor a human user, for example, by means of an appropriate editor or comparable program, and/or can be provided for further mechanical processing of the information contained. The file can be, for example, a text file.

Figure 6:
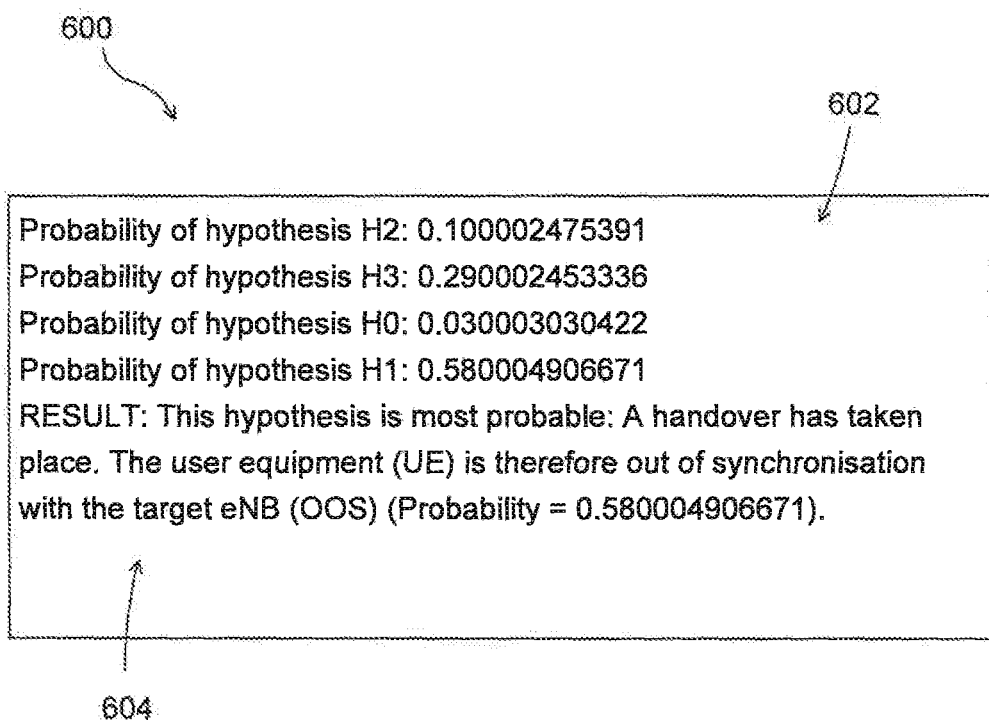
FIG. 6 an example of a possible command-line output during the procedure of FIG. 4.

FIG. 6 shows an example of an output 600, which could be generated by the component 174 for insertion in a text report and/or display on a display screen, for example, in a command-line environment. The probability values calculated for the causes or respectively hypotheses H0-H3 are output in result lines 602 as they result from step 412. In further result lines 604, at least the cause for which the highest probability has been calculated can be named in text form. In the present example, it was determined, on the basis of the observed occurrence or respectively non-occurrence of the events A0-A3 in the test log 112, that the most probable cause for a loss of synchronisation between the DUT 102 and TE 104 is a handover (HO). For this cause (H1), a higher probability was calculated than for the other causes, such as the occurrence of an error in the DUT 102 (H3).

Figure 7:
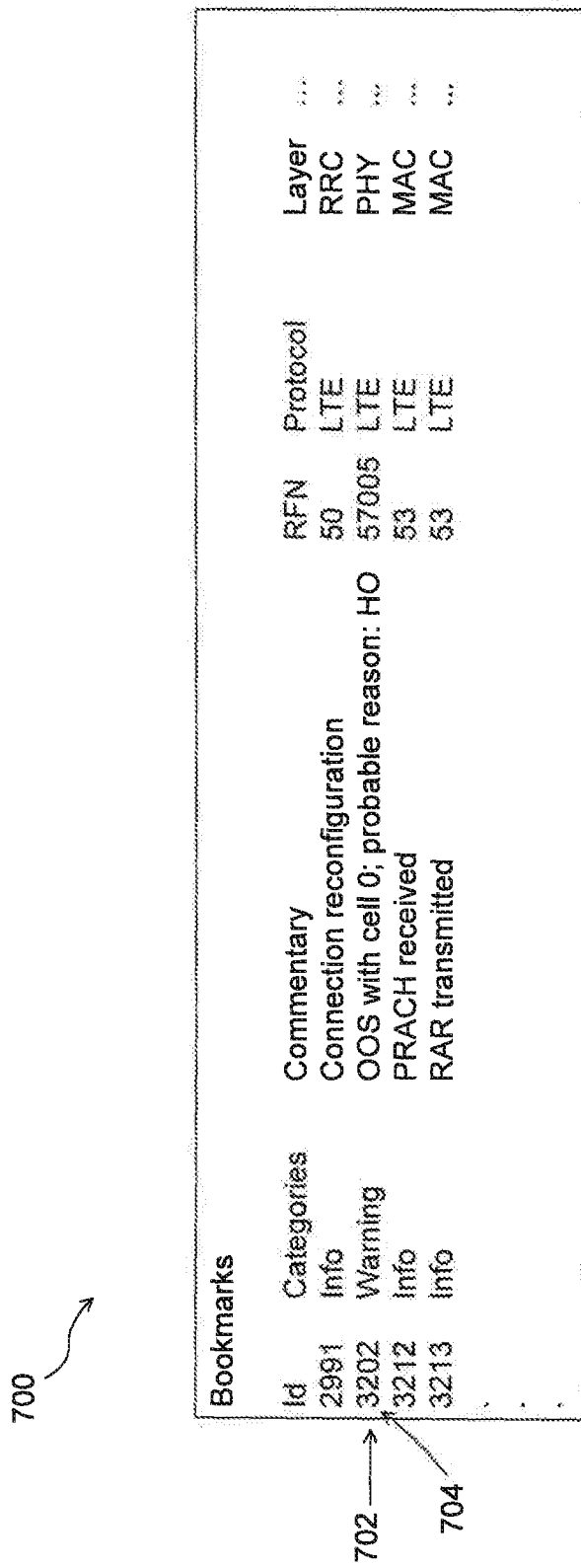
FIG. 7 an example of an entry in a test report at the end of the procedure from FIG. 4.

FIG. 7 shows in schematic form an exemplary excerpt from a test report 700, which indicates substantial positions, so far as these have been detected, automatically in the test log 112, in the form of a list of bookmarks, and lists a sequence with further information for each indicated position. Entries in the list 700 may be attributable both to events from the test evaluation according to the invention and also from a conventional test evaluation.

The component 174 has initiated the generation of a bookmark 702, which refers to a given position in the test log 112 and indicates a probable cause for an error situation allocated to this position. In detail, a warning is set by the bookmark 702. At the position designated by the ID 704, a synchronisation loss (OOS, "Out of Sync") of the DUT 102 has been determined. The ID 704 can be a transfer address. In other exemplary embodiments, a line number, a timestamp or other position details can be indicated directly in the test log 112.

The bookmark 702 further contains a short textual indication relating to the cause of the OOS, as calculated with the procedure according to the invention described above. In the case of a presentation of the test report on the console 164, further information could be displayed by clicking on the line 702, for example, providing a level of detail as in the command-line output 600 from FIG. 6.

Instead of only outputting the most probable cause, several causes can also be output, for example, if two or more maximum probabilities are disposed side-by-side within a corridor of, for example, 10%.

The classifier 166 in FIG. 5 is represented as a two-layer network. However, a probabilistic model according to the invention can also be represented by a three-layer or multi-layer network, especially for the automated analysis of more complex questions. Accordingly, a series of observations or events can be initially measured in a test log and then attributed, by means of an evaluation as described above, to one or more probable causes, which, however, for their part, can be attributed yet again to more basic causes, and so on.

In general, both events and causes can ultimately be regarded as processes; that is to say, a process can be represented in a probabilistic model equally well as an event and also as a cause. On this basis, a three-layer network can be treated as a combination of two two-layer networks, as described above. The causes, including the calculated probability values of the first two-layer network, go into the second two-layer network as results. The analysis of time dependencies, for example, with regard to a sequence of messages in the test log, can be cited as an example of a complex analysis, which is offered for representation in a multi-layer network.

While the classifier 166 in FIG. 5 is embodied for the determination of the most probable cause for an OOS, other classifiers can be embodied correspondingly for the automated response to a plurality of other analytical questions, for example, with regard to a mobile-radio user-device, relating to questions of why an application in the network does not function, why a handover does not function, why a data transmission does not function, why a data-transmission rate is too low, and so on. For the testing of network nodes, such as base stations, similar questions can also be made accessible for an automated evaluation in the form of classifiers as suggested according to the invention.

An expert system like the system 164 in FIGS. 1, 2, can be embodied for the test evaluation on the basis of a plurality of different probabilistic models. In this context, a procedure such as described above with reference to FIGS. 3, 4 can be implemented several times sequentially or in parallel for different classifiers. The models or respectively classifiers can be used on one and the same test log and can investigate different questions in this context in an automated manner.

The evaluation by means of classifiers according to the invention can be offered to the user in the form of one (or more) evaluation tools. Within the framework of this tool, the user can select or deselect one or more questions. The optional entry of events, causes and probability values for the links can also be implemented within the framework of the evaluation tool. It is also conceivable for a dedicated view or respectively a dedicated window to be open or respectively opened for the tool, or for each selected classifier, for example, on a display screen of the evaluation console 164, in which the evaluation results are then also displayed, either in abbreviated form, as shown by way of example in FIG. 7, or in greater detail, as in FIG. 6.

The method procedures described here can generally be implemented in the form of hardware circuits, as software in combination with a programmable microprocessor, an application-specific integrated circuit (ASIC) and/or with the use of one or more digital signal processors (DSP). A software coding of the method described here can be stored, for example, in a Random-Access-Memory (RAM) or a Read-Only-Memory (ROM), for example an "Erasable Programmable ROM" (EPROM) or comparable semi-permanent or permanent storage medium.

The invention is not restricted to the exemplary embodiments described and the aspects highlighted here; on the contrary, within the scope indicated by the dependent claims, a plurality of developments are possible which are disposed within the range of activity of the person skilled in the art. In particular, to the person skilled in the art, given combinations of features described separately above are evident as expedient or advantageous.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed:

1. A method for the automated evaluation of a test log for testing telecommunications equipment, the method comprising:
   providing a probabilistic model, which links a plurality of possible events in the test log with a plurality of possible causes;
   searching the test log for the occurrence of at least one of the possible events;
   calculating probability values for the plurality of possible causes with the probabilistic model and a search result; and
   providing an indication of at least one possible cause for the at least one of the possible events in the test log based on the calculated probability values, wherein consideration of at least one event and/or consideration of at least one cause are specified or selected from a menu.

2. The method according to claim 1, further comprising assigning a predefined probability value to at least one link in the probabilistic model, which is used for the calculation of the probability values for the plurality of possible causes.

3. The method according to claim 1, wherein each link associates one event with one possible cause, and one probability value is allocated to each link.

4. The method according to claim 1, wherein each event is linked to all possible causes that are represented in the probabilistic model.

5. The method according to claim 1, wherein the probabilistic model comprises a Bayesian network, a neural network, and/or a decision tree.

6. The method according to claim 1, wherein the plurality of events relate to the occurrence or nonoccurrence of at least one message, the occurrence or non-occurrence of a parameter in a message, and/or the occurrence or non-occurrence of a parameter value of a parameter in a message.

7. The method according to claim 1, wherein separate probability values are allocated to the occurrence of, or the non-occurrence of, a message, a parameter or a parameter value.

8. The method according to claim 1, wherein the probabilistic model comprises the possibility of an unknown cause.

9. The method according to claim 1, wherein the probabilistic model comprises a multi-layer network with an event layer, an intermediate layer, or a cause layer, wherein nodes of the intermediate layer represent causes for the event layer and/or events for the cause layer.

10. The method according to claim 9, wherein at least one of the nodes of the intermediate layer represents a chronological sequence of events.

11. A computer system including an expert system for the evaluation of test logs of telecommunications devices, and an evaluation tool within the framework of the expert system, the evaluation tool configured to:

provide a probabilistic model, which links a plurality of events in the test log with a plurality of possible causes;
search the test log for the occurrence of the events;
calculate probability values for the plurality of possible causes with the probabilistic model and a search result; and
provide an indication of at least one possible cause for at least one of the events in the test log from the calculated probability values, wherein consideration of at least one event and/or consideration of at least one cause are specified or selected from a menu.

12. The computer system according to claim 11, wherein the evaluation tool is further configured to allow user entries relating to the consideration of at least one event, the consideration of at least one cause, and/or the indication of at least one probability value for a link.

13. The computer system according to claim 11, wherein the evaluation tool is further configured to provide a plurality of probabilistic models for different questions for the evaluation of the test logs.

14. The method according to claim 1, wherein the plurality of possible events includes non-detection of an observation, or a process, in the test log.

15. The method according to claim 1, wherein the search of the test log comprises pattern matching or pattern recognition, or a targeted search in which a search of a pattern is implemented following the detection of another pattern.

16. The computer system according to claim 11, wherein the plurality of possible events includes non-detection of an observation, or a process, in the test log.

17. The computer system according to claim 11, wherein the searching of the test log comprises pattern matching or pattern recognition, or a targeted search in which a search of a pattern is implemented following the detection of another pattern.

* * * * *